(12) United States Patent
Gafni et al.

(10) Patent No.: US 12,166,659 B2
(45) Date of Patent: Dec. 10, 2024

(54) DYNAMIC PACKET ROUTING USING PRIORITIZED GROUPS

(71) Applicant: Mellanox Technologies, Ltd., Yokneam (IL)

(72) Inventors: Barak Gafni, Sunnyvale, CA (US); Donald Bruce Sharp, Apex, NC (US)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/465,760

(22) Filed: Sep. 2, 2021

(65) Prior Publication Data
US 2023/0068443 A1  Mar. 2, 2023

(51) Int. Cl.
*H04L 45/122* (2022.01)
*H04L 45/121* (2022.01)
*H04L 45/24* (2022.01)

(52) U.S. Cl.
CPC .......... *H04L 45/122* (2013.01); *H04L 45/121* (2013.01); *H04L 45/24* (2013.01)

(58) Field of Classification Search
CPC ...... H04L 45/122; H04L 45/121; H04L 45/24
See application file for complete search history.

(56) References Cited

U.S. PATENT DOCUMENTS

| | | | | |
|---|---|---|---|---|
| 5,687,167 A * | 11/1997 | Bertin | ................. | H04L 12/5602 370/254 |
| 6,904,017 B1 * | 6/2005 | Meempat | ............ | H04L 65/1069 370/252 |
| 9,036,504 B1 * | 5/2015 | Miller | ................... | H04L 45/586 370/254 |
| 2002/0141345 A1 * | 10/2002 | Szviatovszki | .......... | H04L 45/50 709/241 |
| 2003/0033427 A1 * | 2/2003 | Brahmaroutu | .......... | H04L 45/02 709/238 |
| 2006/0013127 A1 * | 1/2006 | Izaiku | ..................... | H04L 45/50 370/242 |
| 2009/0034971 A1 * | 2/2009 | Sadanada | ............ | H04J 14/0269 398/48 |
| 2010/0074101 A1 * | 3/2010 | Skalecki | ................. | H04L 45/03 370/254 |

(Continued)

OTHER PUBLICATIONS

Kim et al, "Technology-Driven, Highly-Scalable Dragonfly Topology," IEEE, 2018, 12 pgs.

(Continued)

*Primary Examiner* — Atique Ahmed
(74) *Attorney, Agent, or Firm* — Lowenstein Sandler LLP (57) ABSTRACT

An example method for dynamic packet routing using prioritized groups includes: receiving, by a processing device, routing information specifying a plurality of paths to a network destination, wherein each path is associated with a respective cost metric value; associating a first subset of the plurality of paths with a first priority routing group for the network destination, wherein each path of the first subset satisfies a first cost criterion based on a cost metric value of the path; associating a second subset of the plurality of paths with a second priority routing group for the network destination, wherein each path of the second subset satisfies a second cost criterion; and storing, in a forwarding information data structure, a first definition of the first priority routing group and a second definition of a second priority routing group.

20 Claims, 5 Drawing Sheets

(56) References Cited

U.S. PATENT DOCUMENTS

| | | | | |
|---|---|---|---|---|
| 2010/0142447 A1* | 6/2010 | Schlicht | ................. | H04W 4/20 |
| | | | | 370/328 |
| 2010/0268447 A1* | 10/2010 | Griffiths | ............. | G01C 21/3423 |
| | | | | 701/532 |
| 2014/0280834 A1* | 9/2014 | Medved | .............. | H04L 41/0609 |
| | | | | 709/223 |
| 2015/0350062 A1* | 12/2015 | Lindem, III | ............ | H04L 45/22 |
| | | | | 370/220 |
| 2017/0331724 A1* | 11/2017 | Carney | ................. | H04L 45/033 |
| 2018/0097725 A1* | 4/2018 | Wood | ....................... | H04L 45/60 |
| 2019/0260879 A1* | 8/2019 | Raleigh | ................ | H04M 15/83 |
| 2021/0029019 A1* | 1/2021 | Kottapalli | ............ | H04L 41/5025 |
| 2021/0160168 A1* | 5/2021 | Li | ......................... | H04L 47/125 |
| 2021/0297345 A1* | 9/2021 | Sawyer | .............. | H04L 49/3009 |

OTHER PUBLICATIONS

Shpiner, et al., "Dragonfly+: Low Cost Topology for Scaling Datacenters," ResearchGate, Feb. 2017, 9 pgs.

* cited by examiner

DYNAMIC PACKET ROUTING USING PRIORITIZED GROUPS

TECHNICAL FIELD

The present disclosure relates to routing for dynamic networks, and more specifically, to dynamic packet routing using prioritized groups.

BACKGROUND

Packet routing in modern networks is a complex process, involving codependent functions running on multiple computing devices, such as routers, switches, and firewalls from different vendors. As a result, a substantial effort may be involved in ensuring network correctness, reliability, fault tolerance, low latency, and high performance

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

Described herein are system and methods for dynamic packet routing using prioritized groups.

In the below description and examples, references are made to Open Systems Interconnection (OSI) model layers, including the network layer (layer 3), as defined by Recommendation X.200 (07/94) by International Telecommunications Union (ITU). The network layer provides the functional and procedural means of transferring variable-length data sequences ("network packets") from a source to a destination host via one or more networks, while maintaining the quality of service functions. Functions of network layer protocols include host addressing and packet forwarding ("routing").

"Router" herein refers to a computing device equipped with at least two network interfaces and employed for routing OSI Layer 3 (network layer) packets between the networks connected to the respective network interfaces.

Depending upon the network topology, for a given source node there may be multiple paths to a certain destination node. Some routing solutions select, based on the acquired knowledge of the network topology, the least cost path to the destination, i.e., the path having the minimal, among multiple available paths, value of a chosen cost metric. The cost metric may reflect certain characteristics of a given path, such as the number of hops and/or latency. "Hop" as used herein refers to a direct network link, i.e., a network path between two neighboring nodes.

While some routing algorithms support dynamic routing that reflects the changing network state, those algorithms may not be adaptable to allow using a suboptimal network path irrespectively of the state of the identified least cost network path.

Aspects of the present disclosure address the above and other deficiencies of various routing solution by providing a technique that utilizes prioritized routing group and thus allows using a suboptimal network path associated with a low priority group if all network paths associated with the high priority groups are experiencing a high load (e.g., exhibit high latency).

In an illustrative example, a given node (e.g., a router operating at the OSI Layer 3 (network layer)) may have multiple network interfaces. At least some of those network interfaces may be utilized by respective network paths to a specified destination (identified, e.g., by a corresponding subnet address), to which a network packet needs to be delivered. The paths may differ by their respective cost metric values. Thus, while the least cost path may be the preferred path for delivering packets to the specified destination, other (higher cost) paths could be used when the least cost path is experiencing a high load or is otherwise disqualified. In particular, a network node may, based on analyzing the received routing information, associate one or more identified optimal paths to a given destination with the high priority routing group, while associating one or more identified suboptimal paths with the low priority routing group, as described in more detail herein below.

As an illustrative example, the family of network topologies that would benefit from the dynamic priority-based routing includes topologies that may be used in high performance networks such as the Fly network topologies, which includes Dragonfly, Dragonfly+, and various other topologies. Advantages of the present disclosure include improving the overall performance of the network while reducing the latency of packet delivery by utilizing the prioritized routing groups without the need to run a centralized network management system.

Figure 1:
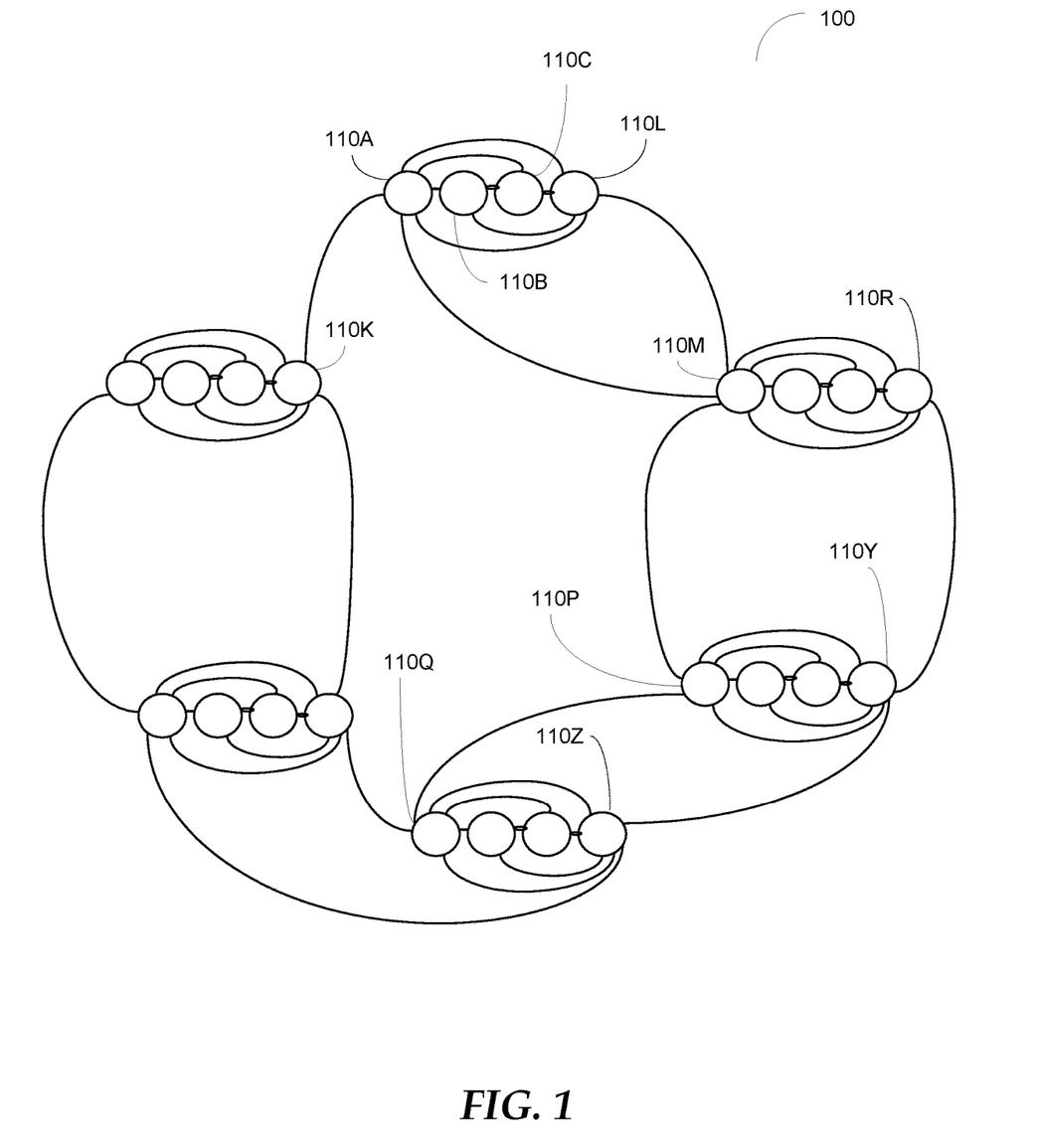
FIG. 1 illustrates a network diagram of an example network including one or more nodes operating in accordance with aspects of the present disclosure.

FIG. 1 illustrates a network diagram of an example network 100 including one or more nodes 110 operating in accordance with aspects of the present disclosure. The network 100 may include one or more public and/or one or more private networks, each of which may be provided by one or more wired and/or one or more wireless networks. In an illustrative example, the network 100 may be compliant with one of the Fly network topologies, e.g., Dragonfly, or Dragonfly+. Each node 110 may maintain various data structures storing the routing information utilized for forwarding network packets, as described in more detail herein below with reference to FIG. 2.

In an illustrative example, the network 100 may be compliant with Dragonfly topology, which is a hierarchical topology including multiple groups of network nodes. The same topology is used for connecting the nodes within each group. Each group has multiple routers that are connected with other groups: each router switches is connected to all groups. This type of topology focuses on reducing the number of long links and the network diameter.

In another illustrative example, the network 100 may be compliant with Dragonfly+topology having the following properties: the group topology is 2-level clos; the leafs inside the group are connected to spines inside the group; and intra-group interconnections are only the connections between spines in different groups.

These and various other network topologies may require non-minimal global adaptive routing and advanced congestion look ahead for efficient operation.

Figure 2:
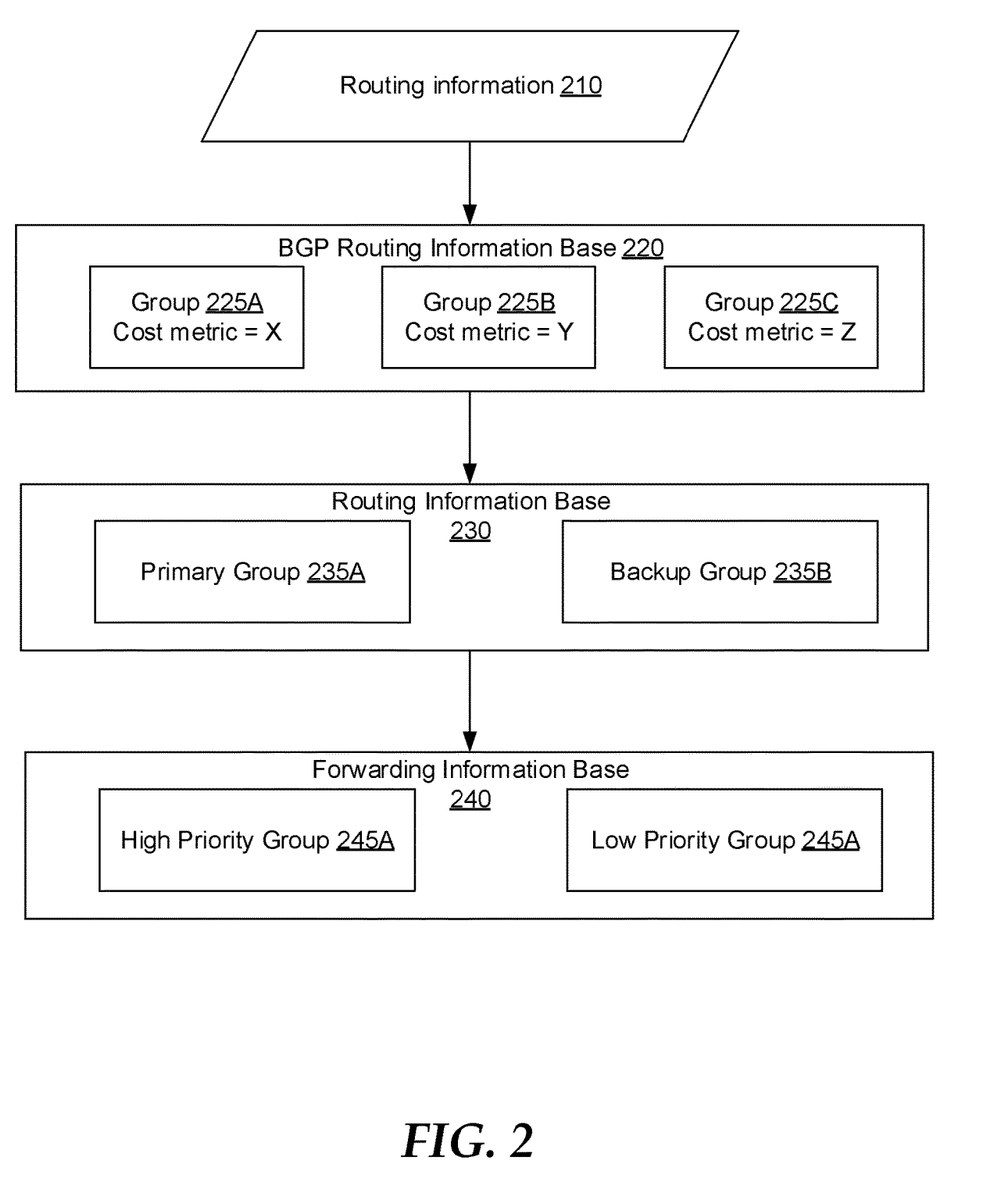
FIG. 2 schematically illustrates example routing data structures, which may be utilized for storing routing information by network nodes operating in accordance with aspects of the present disclosure.

FIG. 2 schematically illustrates example routing data structures, which may be utilized for storing routing information by a network node (e.g., node 110 of FIG. 1) operating in accordance with aspects of the present disclosure. In an illustrative example, a node 110 may be a Layer 3 (network layer) router. The node 110 may employ one or more data structures for maintaining various routing information, including the Routing Information Base (RIB) 230 and Forwarding Information Base (FIB) 240. The RIB 230 may store the routing information learned via static route definitions or a dynamic routing information. The FIB 240 may store the routing information that is derived from RIB 230 and may be used by the node 110 for identifying the network interface which should be utilized for forwarding a given network packet to its intended network destination.

In an illustrative example, the node 110 may periodically receive routing information 210 from one or more peer nodes and/or other network devices. The routing information may be compliant with and provided by a certain routing protocol, e.g., Border Gateway Protocol (BGP). The received routing information may be stored in the BGP RIB 220. The routing information may identify network paths to certain network destinations. In an illustrative example, a network destination may be specified by its subnetwork (subnet) address, and the network path may be specified by the address of the next hop node (i.e., a node having a direct network link with the node 110). In the illustrative example of FIG. 1, the nodes 110B, 110C, 110K, 110L, and 110M are next-hop nodes for the node 110A.

In some implementations, the routing information may specify, for each network path, its respective cost metric value. A chosen cost metric may reflect certain characteristics of a given path, such as the number of hops and/or latency. In the illustrative example of FIG. 1, if the chosen cost metric is equal to the number of hops on the path, the path from node 110A to node 110Z via nodes 110M, 110P, and 110Q may have the cost metric value of 4, while the path from node 110A to node 110Z via nodes 110L, 110M, 110R, and 110Y may have the cost metric value of 5.

Thus, for each network destination of one or more network destinations that are reachable from the node 110, the BGP RIB 220 may include multiple Equal Cost Multiple Paths (ECMP) groups of network paths based on the respective values of the chosen cost metric. In the illustrative example of FIG. 2, the BGP RIB 220 includes, for a given network destination, the ECMP group 225A of the network paths whose cost metric value is X, the ECMP group 225B of the network paths whose cost metric value is Y>X, and the ECMP group 225C of the network paths whose cost metric value is Z>Y. Thus, in the illustrative example of FIG. 2, the cost metric value of X is the lowest cost metric value exhibited by the available network paths for the given network destination. While the illustrative example of FIG. 2 shows the BGP RIB 220 having three ECMP groups, in various other implementations, the number of ECMP groups may vary.

The node 110 may analyze the received routing information to identify one or more optimal paths to a certain network destination. In an illustrative example, an optimal path may have the minimal, among all paths, cost metric value (e.g., the value of X in the example of FIG. 2). In another illustrative example, an optimal path may have a cost metric value that differs from the minimal, among all paths, cost metric value by at most a predefined threshold value (e.g., by a predefined number of hops). The node 110 may store the identified one or more optimal paths in the data structure 235A implementing the primary group of its Routing Information Base (RIB) 230.

The node 110 may further analyze the received routing information to identify one or more suboptimal paths to the certain network destination. The identified suboptimal paths are intended to be used for forwarding network packets if all identified optimal network paths would be experiencing a high load or would be otherwise disqualified (e.g., would exhibit the latency exceeding a predefined threshold latency). A suboptimal path may have the cost metric value exceeding the cost metric value of the identified optimal path by at most a predefined threshold value (e.g., by a predefined number of hops). In the illustrative example of FIG. 2, the group 225B of the network paths whose cost metric value is Y>X may be utilized as the suboptimal paths to the given destination.

The node 110 may store the identified one or more suboptimal paths in the data structure 235B implementing the backup group of its Routing Information Base (RIB) 230. Utilizing the backup group 235B of RIB 230 for storing the identified suboptimal paths allows avoiding introducing any changes into the routing protocol.

The node 110 may then generate or update the FIB 240, which is used for packet routing. Each path in the FIB 240 may include the destination identifier (e.g., the subnet address), the cost metric value, and the interface identifier (e.g., the network address or a symbolic name) of the local interface to be used for forwarding network packets to the identified destination.

Figure 3:
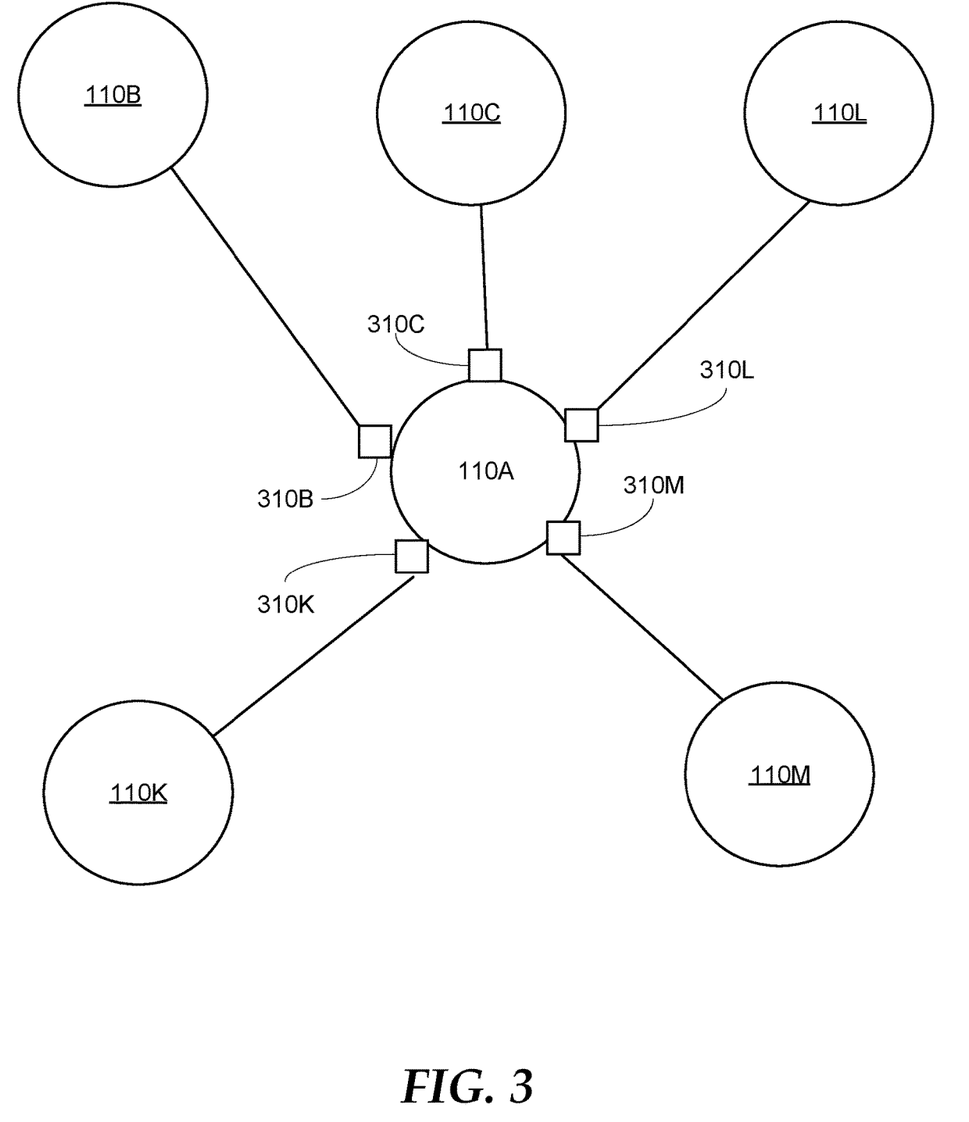
FIG. 3 schematically illustrates the next hope nodes and respective network interfaces of an example network node operating in accordance with aspects of the present disclosure.

FIG. 3 schematically illustrates the next hop nodes and respective network interfaces of the node 110A of FIG. 1. As shown in FIG. 3, for directly forwarding packets to node 110B, node 110A should use local network interface 310B; for directly forwarding packets to node 110C, node 110A should use local network interface 310C; for directly forwarding packets to node 110L, node 110A should use local network interface 310L; for directly forwarding packets to node 110K, node 110A should use local network interface 310K; and for directly forwarding packets to node 110M, node 110A should use local network interface 310M.

Referring again to FIG. 2, the identified paths for the given destination may be grouped into the high priority group 245A and the low priority group 245B. The high priority group 245A may include definitions one or more identified optimal paths from the primary group 235A of the RIB 230. The low priority interface group 245B may include definitions one or more identified optimal paths from the backup group 235B of the RIB 230. Each path definition may include an identifier of the next-hop router (e.g., its network address or symbolic name), an identifier of the local interface (e.g., its network address or symbolic name), and the cost metric value.

In order to forward a network packet to its destination, the node 110 may select one of the paths associated with the destination identifier (e.g., subnet address) from the high priority group 245A, and forward the network packet to the local interface associated with the selected path. Should all the paths of the high priority group 245A be experiencing a high load (e.g., based on the path latency exceeding a predefined threshold latency), the node 110 may select one of the paths associated with the destination specified by the packet from the low priority group 245B, and forward the network packet to the interface associated with the selected path.

While the illustrative example of FIG. 2 shows the RIB 230 and FIB 240 each having two priority routing groups, in various other implementations, the number of priority routing groups may vary.

Figure 4:
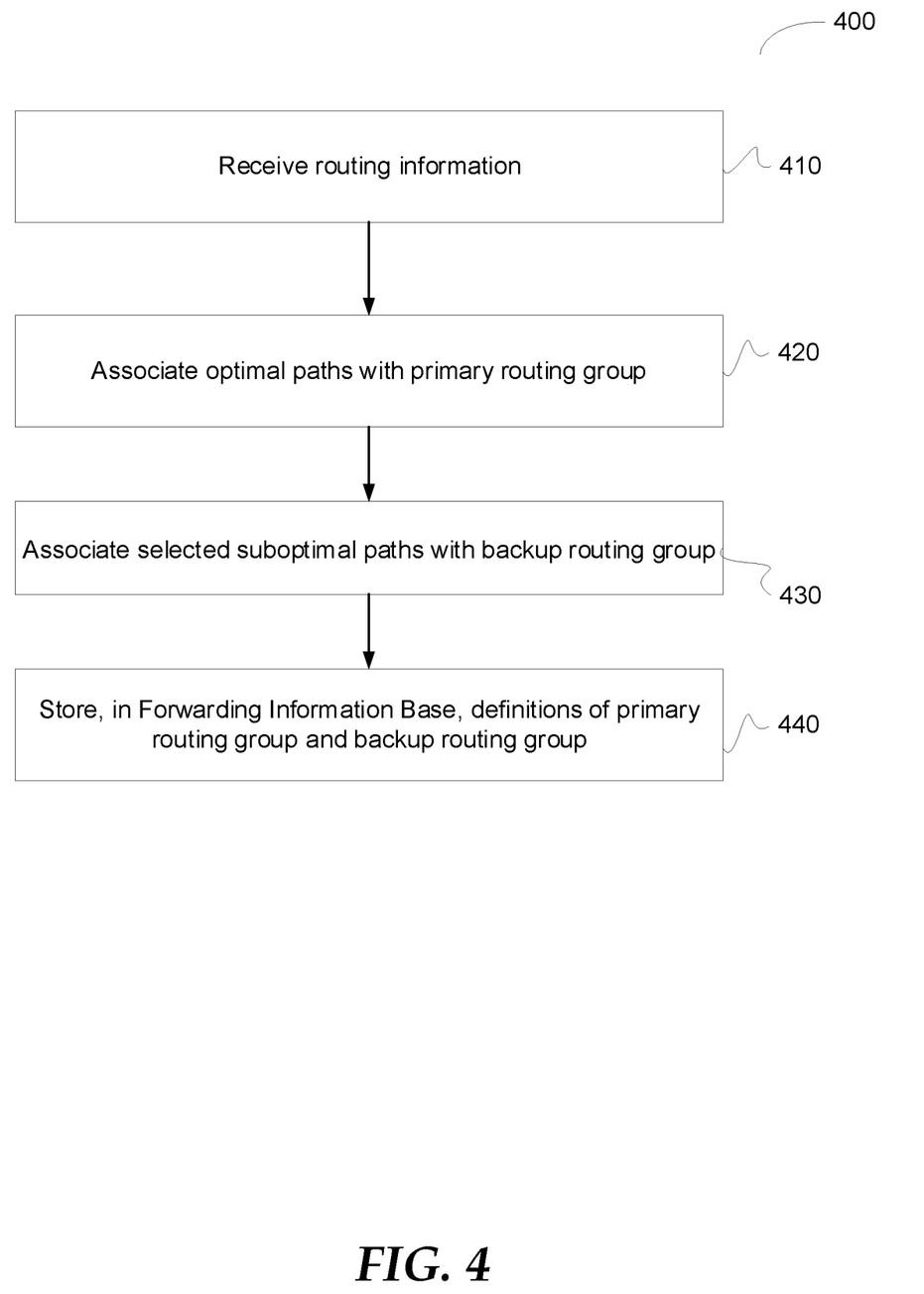
FIG. 4 depicts a flow diagram of an example method of dynamic packet routing using prioritized groups, in accordance with aspects of the present disclosure.

FIG. 4 depicts a flow diagram of an example method 400 of dynamic packet routing using prioritized groups, in accordance with aspects of the present disclosure. Method 400 and/or each of its individual functions, routines, subroutines, or operations may be performed by one or more processors of the computer system (e.g., computer system 500 of FIG. 5) implementing the method. In an illustrative example, method 400 may be implemented by the network node 110 of FIG. 1.

In some implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At operation 410, the processing device implementing the method receives routing information (e.g., from peer nodes and/or other network devices). The routing information may define multiple paths to a specified network destination, and may provide a respective cost metric value for each path. In an illustrative example, the routing information may be compliant with a certain routing protocol, e.g., BGP, as described in more detail herein above.

At operation 420, the processing device selects, among the paths specified by the routing information, a subset of paths satisfying a certain cost criterion. In an illustrative example, the processing device may select one or more least cost paths, e.g., one or more paths having the minimal, among all paths specified by the routing information, value of the cost metric. In another illustrative example, the processing device may select one or more paths having a cost metric value that differs from the minimal, among all paths, cost metric value by at most a predefined threshold value (e.g., by a predefined number of hops). The processing device may store the selected subset of paths in a data structure implementing the primary routing group of the RIB, as described in more detail herein above.

At operation 430, the processing device selects, among the remaining suboptimal paths specified by the routing information, a subset of paths satisfying a different cost criterion. In an illustrative example, the processing device may select one or more paths whose respective cost metric values exceed the minimal metric value but do not exceed a specified cost metric threshold (e.g., a certain number of hops above the minimal metric value). The processing device may store the selected subset of paths in a data structure implementing the backup routing group of the RIB, as described in more detail herein above.

At operation 440, the processing device stores, in a forwarding information data structure, the definitions of the first priority routing group the second priority routing group. The resulting forwarding information data structure may be utilized for identifying a path for forwarding network packets to their respective destination, as described in more detail herein above.

Figure 5:
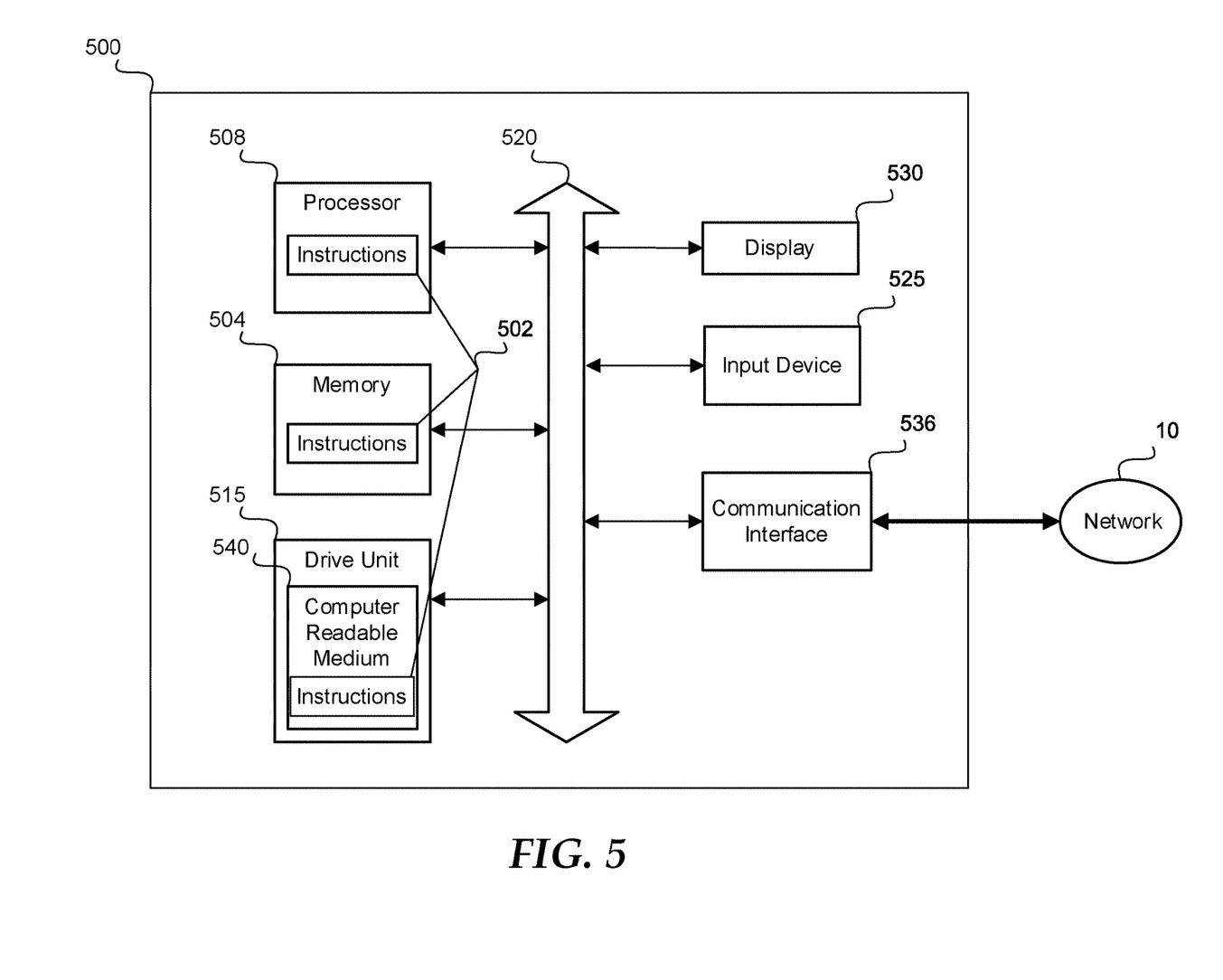
FIG. 5 depicts a block diagram of an example computer system operating in accordance with one or more aspects of the present disclosure.

FIG. 5 depicts a block diagram of an example computer system, which may represent the node 110 and/or any other computing devices operating in accordance with one or more aspects of the present disclosure. The computer system 500 may include an ordered listing of a set of instructions 502 that may be executed to cause the computer system 500 to perform any one or more of the methods or computer-based functions disclosed herein. The computer system 500 may operate as a stand-alone device or may be connected to other computer systems or peripheral devices, e.g., by using the network 10.

In a networked deployment, the computer system 500 may operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile computing device capable of executing a set of instructions 502 that specify actions to be taken by that machine, including and not limited to, accessing the Internet or web through any form of browser. Further, each of the systems described may include any collection of sub-systems that individually or jointly execute a set, or multiple sets, of instructions to perform one or more computer functions.

The computer system 500 may include a memory 504 on a bus 520 for communicating information. Code operable to cause the computer system to perform any of the acts or operations described herein may be stored in the memory 504. The memory 504 may be a random-access memory, read-only memory, programmable memory, hard disk drive or any other type of volatile or non-volatile memory or storage device.

The computer system 500 may include a processor 508, such as a central processing unit (CPU) and/or a graphics processing unit (GPU). The processor 508 may include one or more general processors, digital signal processors, application specific integrated circuits, field programmable gate arrays, digital circuits, optical circuits, analog circuits, combinations thereof, or other now known or later-developed devices for analyzing and processing data. The processor 508 may implement the set of instructions 502 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 500 may also include a disk drive or other storage unit 515. The storage unit 515 may include a computer-readable medium 540 in which one or more sets of instructions 502, e.g., software, may be embedded. Further, the instructions 502 may perform one or more of the methods described herein, e.g., method 300 of dynamic packet routing using prioritized groups. The instructions 502 may reside completely, or at least partially, within the memory 504 and/or within the processor 508 during execution by the computer system 500.

The memory 504 and the processor 508 also may include computer-readable media as discussed above. A "computer-readable medium," "computer-readable storage medium," "machine readable medium," "propagated-signal medium,"

and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 500 may include an input device 525, such as a keyboard or mouse, configured for a user to interact with any of the components of system 500. It may further include a display 530, such as a liquid crystal display (LCD), a cathode ray tube (CRT), or any other display suitable for conveying information. The display 530 may act as an interface for the user to see the functioning of the processor 508, or specifically as an interface with the software stored in the memory 504 or the drive unit 515.

The computer system 500 may include a communication interface 536 such as the network device interface 514 that enables communications via the communications network 10. The network 10 may include wired networks, wireless networks, or combinations thereof. The communication interface 536 network may be represented, e.g., by a NIC (network interface card) or DPU (data processing unit), which may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

What is claimed is:

1. A method comprising:
   receiving, by a node, routing information specifying a plurality of paths from the node to a network destination, wherein each path is associated with a respective cost metric value;
   associating, by the node, a first subset of the plurality of paths to the network destination with a first priority routing group for the network destination, wherein each path of the first subset satisfies a first cost criterion based on a cost metric value of the path;
   associating, by the node, a second subset of the plurality of paths to the network destination with a second priority routing group for the network destination, wherein each path of the second subset does not satisfy the first cost criterion but satisfies a second cost criterion that is based on a cost metric threshold; and
   storing locally, by the node, a first definition of the first priority routing group and a second definition of the second priority routing group in a forwarding information data structure of the node.

2. The method of claim 1, wherein the network destination is identified by a subnetwork address.

3. The method of claim 1, wherein each path of the plurality of paths is associated with an identifier of a next-hop network interface.

4. The method of claim 1, wherein the first cost criterion defines a least cost path.

5. The method of claim 1, wherein the second cost criterion specifies the cost metric threshold.

6. The method of claim 1, wherein the cost metric value of the path reflects one of: a number of hops on the path or a latency of the path.

7. The method of claim 1, wherein the first priority routing group is represented by a primary group of a routing information base (RIB).

8. The method of claim 1, wherein the second priority routing group is represented by a backup group of a routing information base (RIB).

9. The method of claim 1, wherein the forwarding information data structure is represented by a forwarding information base (FIB).

10. The method of claim 1, further comprising:
    identifying, based on the first definition of the first priority routing group and the second definition of a second priority routing group, a network interface for forwarding a network packet to the network destination.

11. A system, comprising:
    a memory; and
    a processing device of a node, coupled to the memory, the processing device of the node to:
    receive routing information specifying a plurality of paths from the node to a network destination, wherein each path is associated with a respective cost metric value;
    associate a first subset of the plurality of paths to the network destination with a first priority routing group for the network destination, wherein each path of the first subset satisfies a first cost criterion based on a cost metric value of the path;
    associate a second subset of the plurality of paths to the network destination with a second priority routing group for the network destination, wherein each path of the second subset does not satisfy the first cost criterion but satisfies a second cost criterion that is based on a cost metric threshold; and store locally, in a forwarding information data structure, a first definition of the first priority routing group and a second definition of the second priority routing group.

12. The system of claim 11, wherein the first cost criterion defines a least cost path, and wherein the second cost criterion specifies the cost metric threshold.

13. The system of claim 11, wherein the cost metric value of the path reflects at least one of: a number of hops on the path or a latency of the path.

14. The system of claim 11, wherein the first priority routing group is represented by a primary group of a routing information base (RIB).

15. The system of claim 11, wherein the second priority routing group is represented by a backup group of a routing information base (RIB).

16. The system of claim 11, wherein the forwarding information data structure is represented by a forwarding information base (FIB).

17. The non-transitory computer-readable storage medium of claim 16, wherein the second priority routing group is represented by a backup group of a routing information base (RIB).

18. A non-transitory computer-readable storage medium comprising executable instructions that, when executed by a computing system, cause the computing system to:

receive, by a node, routing information specifying a plurality of paths from the node to a network destination, wherein each path is associated with a respective cost metric value;

associate, by the node, a first subset of the plurality of paths to the network destination with a first priority routing group for the network destination, wherein each path of the first subset satisfies a first cost criterion based on a cost metric value of the path;

associate, by the node, a second subset of the plurality of paths to the network destination with a second priority routing group for the network destination, wherein each path of the second subset does not satisfy the first cost criterion but satisfies a second cost criterion that is based on a cost metric threshold; and store locally, by the node, a first definition of the first priority routing group and a second definition of the second priority routing group in a forwarding information data structure of the node.

19. The non-transitory computer-readable storage medium of claim 18, wherein the first cost criterion defines a least cost path, and wherein the second cost criterion specifies the cost metric threshold.

20. The non-transitory computer-readable storage medium of claim 18, wherein the cost metric value of the path reflects at least one of: a number of hops on the path or a latency of the path.

* * * * *